(12) United States Patent
Benhammadi

(10) Patent No.: US 12,443,548 B2
(45) Date of Patent: Oct. 14, 2025

(54) FLASH MEMORY DEVICE

(71) Applicant: STMicroelectronics (Alps) SAS, Grenoble (FR)

(72) Inventor: Jawad Benhammadi, Pont de Claix (FR)

(73) Assignee: STMICROELECTRONICS (ALPS) SAS, Grenoble (FR)

( * ) Notice: Subject to any disclaimer, the term of this patent is extended or adjusted under 35 U.S.C. 154(b) by 0 days.

(21) Appl. No.: 18/365,031

(22) Filed: Aug. 3, 2023

(65) Prior Publication Data

US 2024/0045815 A1     Feb. 8, 2024

(30) Foreign Application Priority Data

Aug. 4, 2022 (FR) ...................................... 2208087

(51) Int. Cl.
    *G06F 13/16*      (2006.01)
    *G06F 12/1045*      (2016.01)
    *G06F 13/40*      (2006.01)

(52) U.S. Cl.
    CPC ...... *G06F 13/1668* (2013.01); *G06F 12/1063* (2013.01); *G06F 13/4063* (2013.01)

(58) Field of Classification Search
CPC ............. G06F 13/1668; G06F 13/1063; G06F 13/4063
See application file for complete search history.

(56) References Cited

U.S. PATENT DOCUMENTS

| | | | |
|---|---|---|---|
| 2004/0210720 A1* | 10/2004 | Wong | G06F 12/0638 711/E12.083 |
| 2005/0289313 A1 | 12/2005 | Roohparvar | |
| 2007/0055854 A1* | 3/2007 | Chang | G11C 16/20 713/1 |
| 2007/0083713 A1* | 4/2007 | Torrini | G06F 9/328 711/E12.083 |
| 2008/0010685 A1* | 1/2008 | Holtzman | G06F 12/1483 726/28 |
| 2014/0108703 A1* | 4/2014 | Cohen | G06F 3/0634 711/E12.008 |
| 2016/0196223 A1 | 7/2016 | Lee et al. | |

* cited by examiner

*Primary Examiner* — Kalpit Parikh
(74) *Attorney, Agent, or Firm* — Slater Matsil, LLP

(57) ABSTRACT

A FLASH memory device includes a FLASH memory having an array of non-volatile memory cells and a volatile memory. A FLASH memory interface is arranged outside of the FLASH memory, and a first communication bus couples the FLASH memory interface to the array of memory cells. A second communication bus couples the FLASH memory interface to the volatile memory.

20 Claims, 10 Drawing Sheets

FLASH MEMORY DEVICE

CROSS-REFERENCE TO RELATED APPLICATIONS

This application claims priority to French Application No. 2208087, filed on Aug. 4, 2022, which application is hereby incorporated herein by reference.

TECHNICAL FIELD

The present disclosure generally concerns devices comprising FLASH memories and their operating methods.

BACKGROUND

FLASH memories are mass memories with rewritable semiconductors. They generally comprise an array of memory cells. FLASH memories may be implemented in a multitude of devices, such as in particular memory cards, computers, smart phones, or also vehicles. FLASH memories comprise operation programs, which may require or otherwise benefit from modifications.

SUMMARY

There exists a need or desire to have devices comprising one or a plurality of FLASH memories, the operation programs of which can be modified.

The present disclosure provides one or more embodiments which overcomes all or part of the disadvantages of known FLASH memories.

In at least one embodiment, a FLASH memory device is provided that includes a FLASH memory that includes an array of non-volatile memory cells and a volatile memory. A FLASH memory interface is arranged outside of the FLASH memory. A first communication bus couples the FLASH memory interface to the array of non-volatile memory cells. A second communication bus couples the FLASH memory interface to the volatile memory.

In some embodiments, the FLASH memory device includes coupling circuitry configured to couple output lines of processing circuitry, located external to the FLASH memory device, to access lines of the volatile memory of the FLASH memory.

In some embodiments, the coupling circuitry is a bus addressing array.

In some embodiments, the FLASH memory further includes a non-volatile memory storing at least one of a program for controlling a write/programming controller or parameters for setting the array of non-volatile memory cells. The write/programming controller may be configured to implement programming, erasing, and verification of memory data.

In some embodiments, the FLASH memory device includes coupling circuitry configured to couple output lines of processing circuitry, located external to the FLASH memory device, to access lines of the volatile memory and to access lines of the non-volatile memory.

In some embodiments, the FLASH memory interface includes a writing/reading interface configured to write data into the array of non-volatile memory cells of the FLASH memory, and to read data from the array of non-volatile memory cells of the FLASH memory.

In some embodiments, the second communication bus is a synchronous bus.

In some embodiments, the FLASH memory includes at least one register storing at least one of a value of configuration of the FLASH memory or parameters for setting the array of non-volatile memory cells.

In some embodiments, the FLASH memory device includes coupling circuitry configured to couple output lines of processing circuitry, located external to the FLASH memory device, to access lines of the at least one register.

In some embodiments, the array of non-volatile memory cells is configured to store a value of configuration of the volatile memory and a program patch in an access protected control area of the FLASH memory.

In some embodiments, the array of non-volatile memory cells is configured to store a program patch, and the FLASH memory interface includes a finite state machine configured to control obtaining of the program patch from the array of non-volatile memory cells and delivering the program patch to the volatile memory via the second communication bus.

In some embodiments, the FLASH memory interface includes virtual address translation circuitry configured to translate virtual addresses into physical addresses.

In at least one embodiment, a method is provided for accessing FLASH memory in a FLASH memory device using a FLASH memory interface arranged outside of the FLASH memory. The FLASH memory includes an array of non-volatile memory cells and a volatile memory. The method includes: accessing data stored in the array of non-volatile memory cells via a first communication bus coupling the FLASH memory interface to the array of non-volatile memory cells; and accessing data stored in the volatile memory via a second communication bus coupling the FLASH memory interface to the volatile memory.

In some embodiments, the method includes: coupling, by coupling circuitry, output lines of processing circuitry, located external to the FLASH memory device, to access lines of the volatile memory of the FLASH memory.

In some embodiments, the method includes: storing, in a non-volatile memory of the FLASH memory, at least one of a program for controlling a write/programming controller or parameters for setting the array of non-volatile memory cells.

In some embodiments, the method includes: storing, in the array of non-volatile memory cells, a value of configuration of the volatile memory and a program patch in an access protected control area of the FLASH memory.

In some embodiments, the method includes: storing, in the array of non-volatile memory cells, a program patch; and controlling, by a finite state machine of the FLASH memory interface, obtaining of the program patch from the array of non-volatile memory cells and delivering the program patch to the volatile memory via the second communication bus.

In at least one embodiment, a method is provided of booting a FLASH memory in a FLASH memory device using a FLASH memory interface arranged outside of the FLASH memory. The FLASH memory includes an array of non-volatile memory cells and a volatile memory, and the array of memory cells is configured to store a value of configuration of the volatile memory and a program patch. The method includes: obtaining the value of configuration of the volatile memory, by the FLASH memory interface via a first communication bus, between a powering up and a boot procedure of the FLASH memory device; and obtaining, based on the value of configuration of the volatile memory, a program patch from the FLASH memory and loading the program patch into the volatile memory of the FLASH memory via a second communication bus.

In at least one embodiment, the method includes: coupling, by coupling circuitry, output lines of processing circuitry, located external to the FLASH memory device, to access lines of the volatile memory of the FLASH memory.

In at least one embodiment, the method includes: storing, in a non-volatile memory of the FLASH memory, at least one of a program for controlling a write/programming controller or parameters for setting the array of non-volatile memory cells.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made, unless specified otherwise, to the orientation of the figures.

Unless specified otherwise, the expressions "around", "approximately", "substantially" and "in the order of" signify within 10%, and preferably within 5%.

Figure 1:
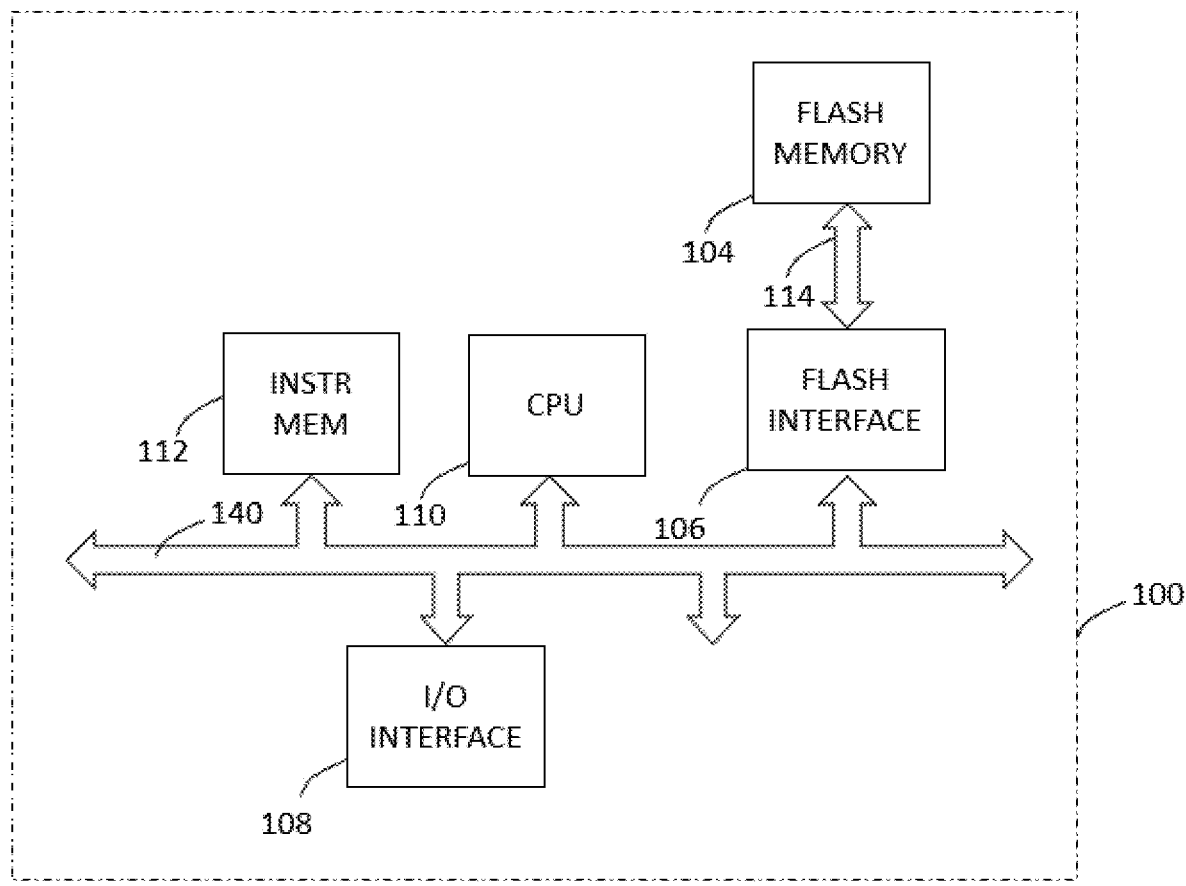
FIG. 1 schematically illustrates an example of a FLASH memory device according to an embodiment of the present disclosure.

FIG. 1 shows an example of a device 100 comprising a FLASH memory, comprising a FLASH memory 104 (FLASH MEMORY) in communication with a FLASH memory interface 106 (FLASH INTERFACE), and configured to write or read data into and from FLASH memory 104.

FLASH memory interface 106 is configured, for example, to ensure in particular the management of the writing and the reading of data into and from FLASH memory 104.

Device 100 further comprises, for example, processing circuitry 110 (which may be referred to herein as a processing unit 110) (CPU). The processing circuitry no may include any circuitry suitable to perform the various functions described herein with respect to the processing circuitry 110. In some embodiments, the processing circuitry 110 may include one or a plurality of processors under control of instructions stored in an instruction memory 112 (INSTR MEM). Instruction memory 112 is for example of random access type (Random Access Memory, RAM). Processing unit no and memory 112 communicate, for example, via a system bus 140. FLASH memory 104 is for example coupled to system bus 140 via FLASH memory interface 106 and via a communication bus 114 coupling FLASH memory interface 106 to FLASH memory 104. In an example, device 100 further comprises an input/output interface 108 (I/O interface) coupled to system bus 140.

Figure 2:
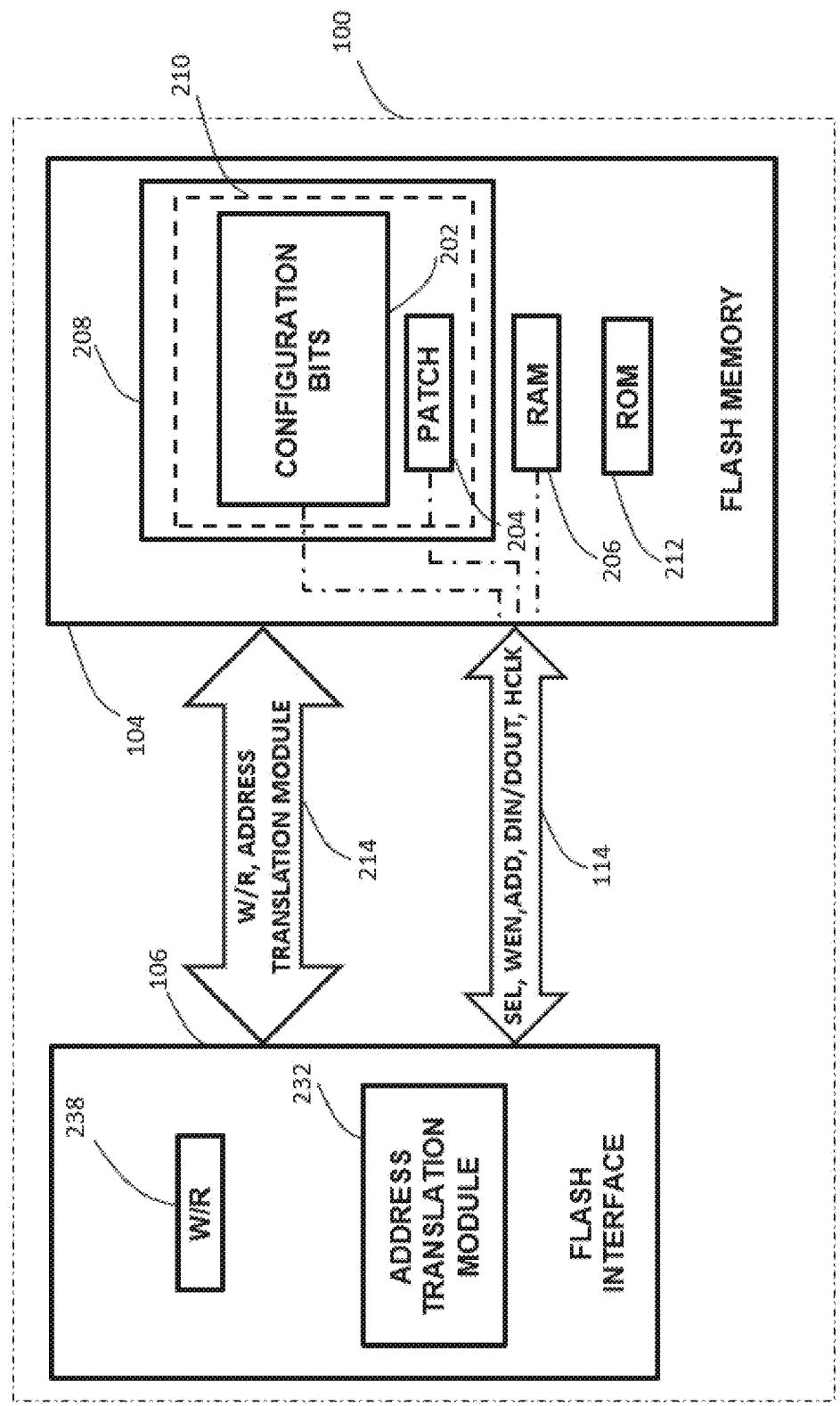
FIG. 2 schematically illustrates a FLASH memory and a FLASH memory interface of FIG. 1 according to an embodiment of the present disclosure.

FIG. 2 schematically shows the FLASH memory 104 and the FLASH memory interface 106 of FIG. 1 in further detail according to another embodiment of the present disclosure.

According to the example of FIG. 2, FLASH memory 104 comprises, for example, an array 208 of non-volatile memory cells. FLASH memory 103 further comprises, for example, a volatile memory 206 (RAM), for example, of RAM type. Array 208 of non-volatile memory cells is for example configured to store a RAM configuration value 202 (CONFIGURATION BITS), this value being formed, for example, of one or a plurality of bits. RAM configuration value 202, which may be in the form of one or a plurality of bits, indicates whether or not a program patch 204 (PATCH) of the FLASH memory is available to be applied. This patch 204 is for example stored in array 208 of non-volatile memory cells.

Program patch 204 is for example a code for correcting an operation program of FLASH memory 104. The operation program of FLASH memory 104 is for example stored in a non-volatile memory 212 (ROM) of FLASH memory 104. Non-volatile memory 104 for example also comprises parameters for setting the array of memory cells 208. Patch 204 for example enables to modify the execution of the operation program of FLASH memory 104. According to an example, patch 204 is stored over a plurality of rows or columns of the array of memory cells.

In a non-illustrated example, configuration value 202 and/or program patch 204 are stored in one or a plurality of non-volatile registers of FLASH memory 104 outside of the array of memory cells 208.

Communication bus 114 allows the communication of data between FLASH memory interface 106 and at least a portion of FLASH memory 104. According to an example, communication bus 114 is configured to be able to communicate with RAM 206. According to an example, communication bus 114 is a synchronous bus, which provides a simplicity of implementation. According to another embodiment, communication bus 114 is of asynchronous type. The bus for example comprises selection signals (SEL) and/or signals enabling to activate the writing of data (WEN) into FLASH memory 104 and/or signals (ADD) containing a physical address of FLASH memory 104 and/or data input and output signals (DIN/DOUT) and/or clock signals (HCLK).

FLASH memory interface 106 is for example arranged outside of FLASH memory 104. In this case, this enables to design memory interface 106 and FLASH memory 104 in differentiated fashion. FLASH memory interface 106 for example forms part of a system on chip (SOC).

According to the example of FIG. 2, the FLASH memory interface comprises, for example, address translation circuitry 232 (which may be referred to herein as address translation module 232) (ADDRESS TRANSLATION MODULE) for translating virtual addresses into physical addresses of FLASH memory 104 and/or an interface 238 for writing/reading (W/R) data to be written into the array 208 of memory cells of FLASH memory 104 and to be read from the array 208 of memory cells of FLASH memory 104.

According to the example of FIG. 2, a general communication bus 214 for example implements the communication between FLASH interface 106 and FLASH memory 104 of data to be written, via write/read interface 238, into the array 208 of non-volatile memory cells of FLASH memory 106 and/or of data read, via write/read interface 238, from the array 208 of non-volatile memory cells of FLASH memory 106.

According to an example, FLASH memory interface 106 is configured to recover program patch 204 from FLASH memory 104. According to an example, the retrieving of patch 204 is obtained after the FLASH memory interface has read and interpreted the configuration value 202 stored in FLASH memory 104. FLASH memory interface 106 is for example further configured to load, into the RAM 206 of FLASH memory 104, patch 204 via communication bus 114.

According to an example, the FLASH memory interface is configured to obtain the RAM configuration value 202 between a powering up (POWER UP) and a boot procedure of device 100 (BOOT), and before the booting of said FLASH memory. This enables to apply patch 204 before FLASH memory 104 starts its operation program.

According to the example of FIG. 2, configuration value 202 and patch 204 are, for example, stored in a control area 210 of the FLASH memory, which is an area reserved to store configuration parameters and having its access protected, the access being for example only allowed to profiles having rights of administration.

Figure 3:
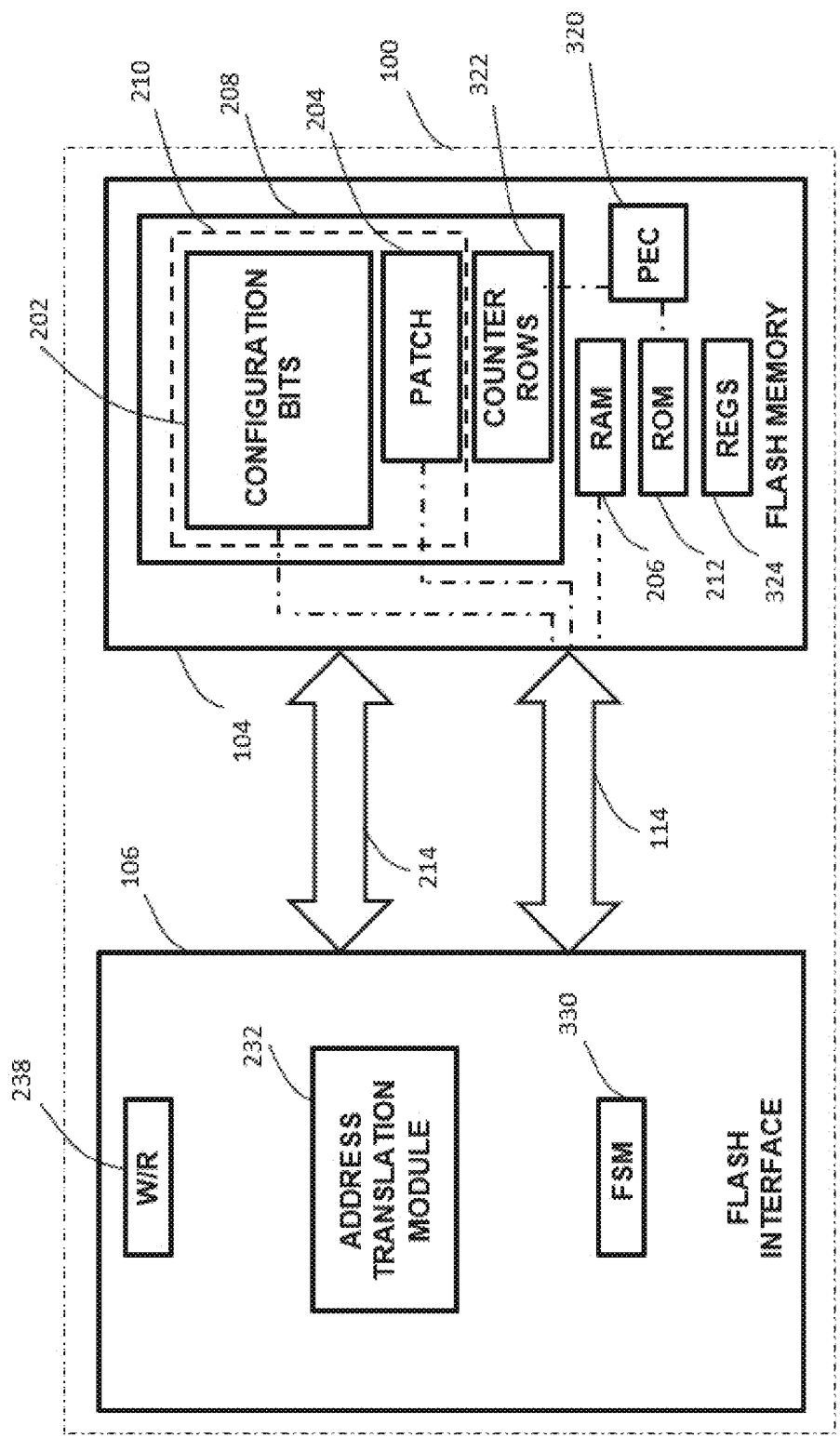
FIG. 3 schematically illustrates the FLASH memory and the FLASH memory interface of FIG. 1 according to another embodiment of the present disclosure.

FIG. 3 schematically shows the FLASH memory 104 and the FLASH memory interface 106 of FIG. 1 according to another embodiment of the present disclosure.

In the example of FIG. 3, the array of memory cells, the program patch, the configuration value, the RAM and ROM memories, as well as the control area of the FLASH memory, are for example similar to those described in relation with FIG. 2. In the example of FIG. 3, the FLASH interface is for example similar to that described in relation with FIG. 2, except that the FLASH memory interface further comprises a finite state machine 330 (FSM). In the example of FIG. 3, communication buses 114 and 214 are for example similar to those of FIG. 2.

In the example of FIG. 3, a position counter 322 (COUNTER ROWS) is arranged in the array of memory cells 208. In an example, not illustrated, the position counter 322 of the array of memory cells 208 is arranged outside of the array of memory cells 208. Position counter 322 follows, for example, the last position of a column of memory cells of the array of memory cells 208 which has been refreshed, particularly that which has been refreshed last. Position counter 322 is used, for example, by a write/programming controller 320 (PEC) configured to implement a control program stored in the ROM non-volatile memory 212 of FLASH memory 104. The control program for example comprises steps of programming, erasing, and verification of memory data, such as an algorithm for programming/erasing the memory cells of array 208. The algorithm for example determines the fastest and most qualitative way of programming and/or erasing the memory cells of array 208. Verification steps are further for example implemented by this algorithm. In an example, the control program forms all or part of the operation program of FLASH memory 104.

According to the example of FIG. 3, the FLASH memory further comprises registers 324 (REGS) storing values of configuration of FLASH memory 104 and/or storing parameters for setting the array of memory cells 208. Registers 324 may further comprise, for example, redundancy information. Registers 324 are for example formed in particular with T-type flip-flops.

According to the example of FIG. 3, the finite state machine 330 (FSM) of FLASH memory interface 106 is configured to manage the obtaining of program patch 204 from FLASH memory 104, as well as its returning to RAM 206 via communication bus 114. This for example enables to recover patch 204, without using software of the FLASH memory which would only be operative after the boot procedure of device 100. This further enables to deliver patch 204, also without using software of the FLASH memory which would only be operative after the booting of device 100, to the RAM 206 of FLASH memory 104, and this before the boot procedure of device 100.

Figure 4:
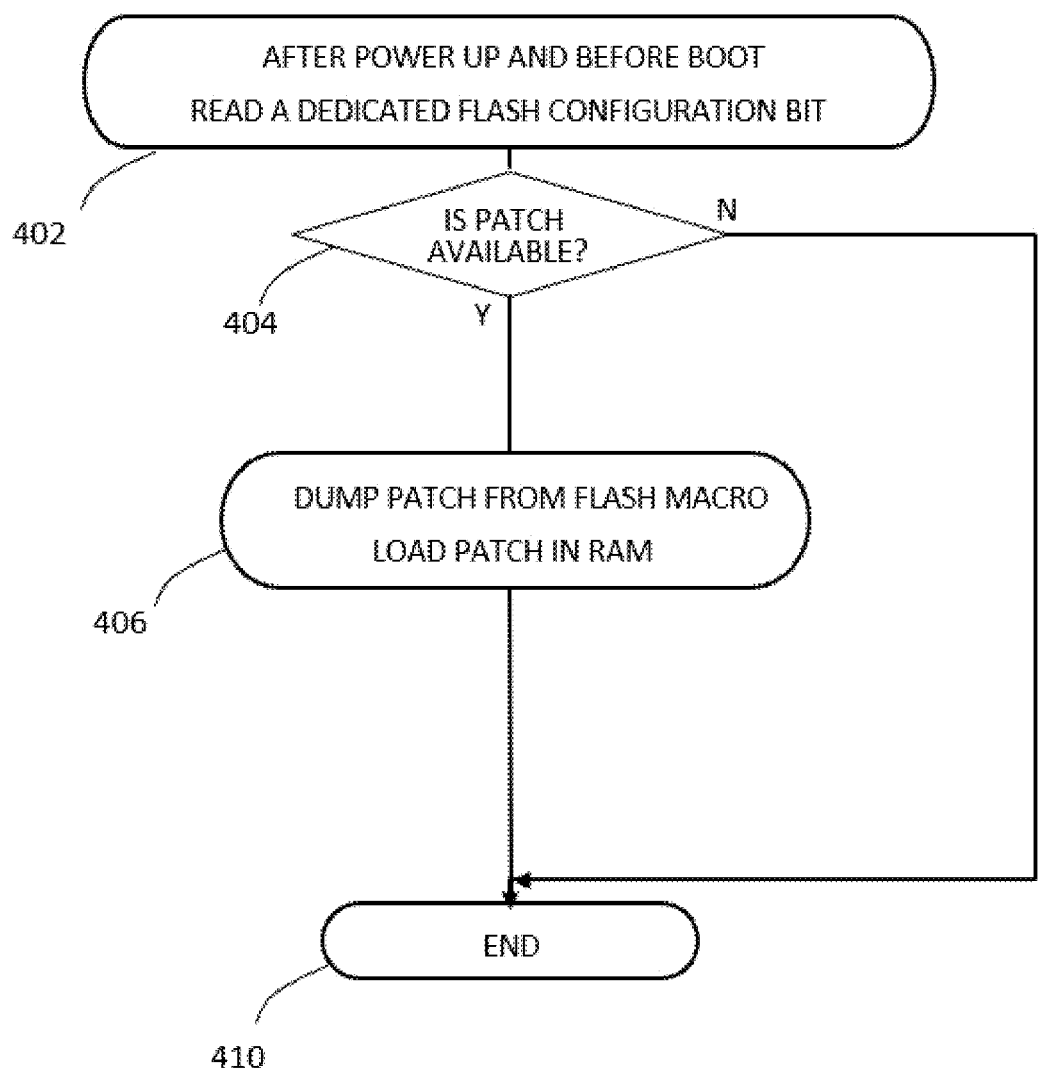
FIG. 4 is a flowchart illustrating a method of booting the FLASH memory of FIG. 2 or 3 in accordance with one or more embodiments.

FIG. 4 shows a method of booting the FLASH memory of FIG. 2 or 3. This method is implemented, for example, by FLASH memory interface 106.

At a step 402 (AFTER POWER UP AND BEFORE BOOT READ A DEDICATED FLASH CONFIGURATION BIT), FLASH memory interface 106 for example reads the FLASH memory configuration value 202. This step 402 occurs after the powering up but before the boot procedure of device 100 and of FLASH memory 104. This step may be implemented for example by finite state machine 330.

At a step 404 (IS PATCH AVAILABLE?), FLASH memory interface 106 determine, according to configuration value 202 whether patch 204 is available in the FLASH memory before its booting process. If it is (branch Y), then a step 406 (DUMP PATCH FROM FLASH MACRO) is carried out. If not (branch N), then the method ends, for example, with a method end step 410 (END).

During step 406, all or part of patch 204 is recovered by FLASH memory interface 106, for example, via finite state machine 330. Patch 204 is then for example stored within FLASH memory interface 106.

In the rest of step 406 (LOAD PATCH IN RAM), patch 204 is returned to communication bus 114, for example, with finite state machine 330. Communication bus 114 then communicates patch 204 to the RAM 206 of FLASH memory 104. Patch 204 can then be implemented by FLASH memory 104 to correct or replace the control program stored in non-volatile memory 212 before its boot procedure starts.

Figure 5:
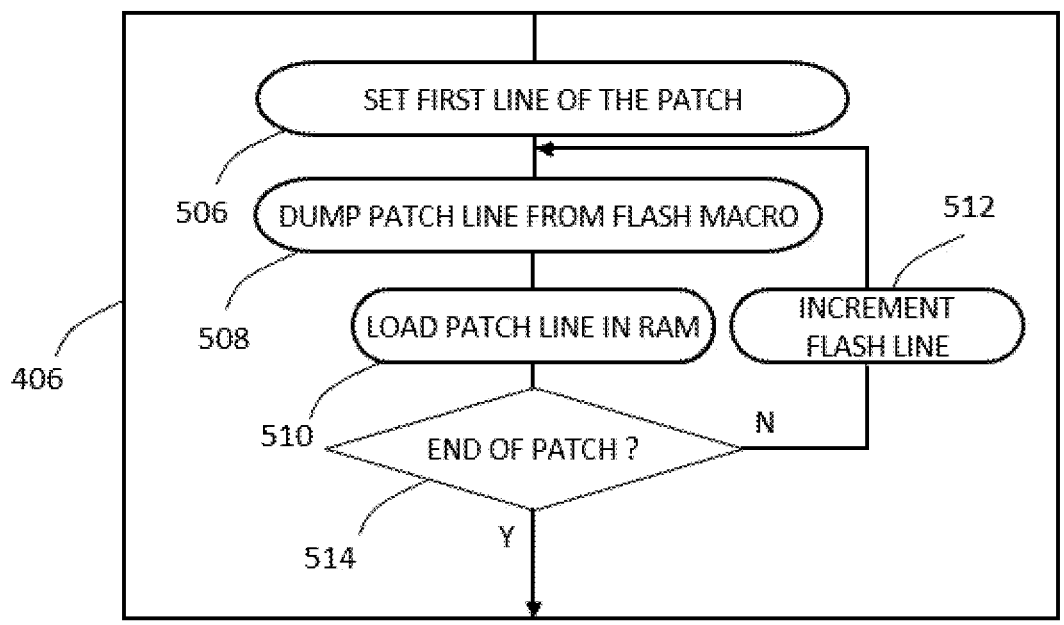
FIG. 5 is a flowchart illustrating an example of implementation of a step of the method of FIG. 4.

FIG. 5 shows an example of implementation of the step 406 of the method of FIG. 4.

At a step 506 (SET FIRST LINE OF THE PATCH), patch 204 is scanned, for example at the level of a portion of patch 204 corresponding to its first line.

At a next step 508 (DUMP PATCH LINE FROM FLASH MACRO), for example, the portion of patch 204 recovered at step 506 is recovered by FLASH memory interface 106.

At a next step 510 (LOAD PATCH IN RAM), the portion of patch 204, recovered at step 508, is delivered to communication bus 114 and stored into RAM 206.

At a step 514 (END OF PATCH?), the FLASH memory interface determines whether the reading of patch 204 has ended (branch Y) or whether there exist other portions of patch 204 to be read (branch N). In the case of branch Y, step 410 is carried out. In the case of branch N, a step 512 (INCREMENT FLASH LINE) is implemented. At this step 512, another portion of patch 204 is read, for example by incrementing the indexes corresponding to the lines of patch 204. After step 512, steps 508, 510, and 514 are implemented again to achieve the reading, for example, of the entire patch 204.

Figure 6:
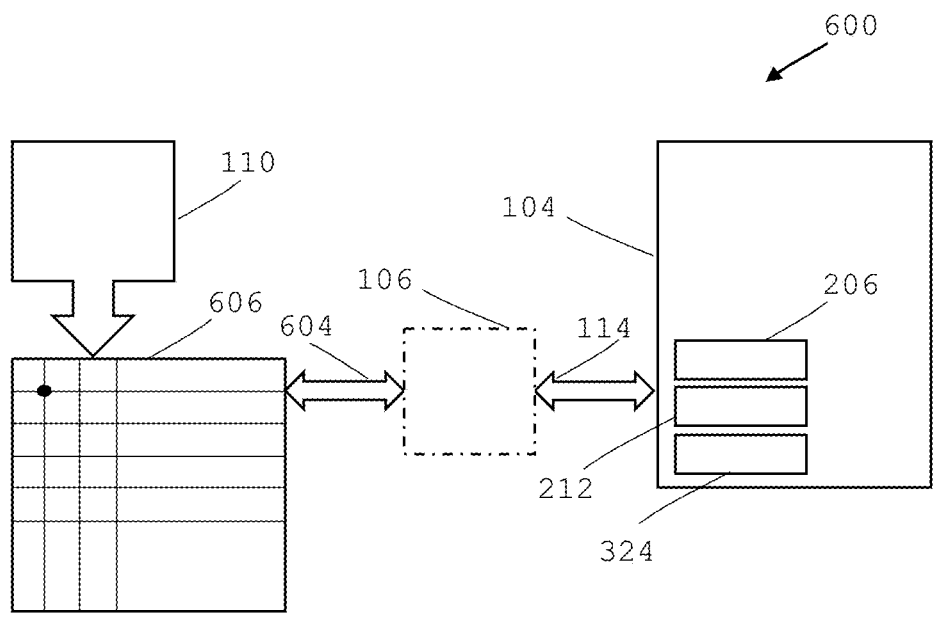
FIG. 6 schematically illustrates an example of a FLASH memory device according to another embodiment of the present disclosure.

FIG. 6 schematically shows an example of a FLASH memory device 600 according to another embodiment of the present disclosure.

In the example of FIG. 6, FLASH memory device 600 is similar, for example, to that of FIGS. 1, 2, and 3. In particular, a plurality of elements of device 600 are the same as elements 100 of FIGS. 1, 2, and 3, and these elements are designated with same reference numerals and will not be described again in detail.

FLASH memory device 600 further comprises coupling circuitry 606 (which may be referred to herein as a coupling module 606) coupling output lines of processing unit 110 to access lines of FLASH memory interface 106. The link ensured by coupling module 606 for example allows the access, by processing unit 110, to RAM 206 via FLASH memory interface 106. In an example, coupling module 606 comprises a bus addressing array, which takes as an input a bus for example of AHB (Advanced High-performance Bus) type, comprising the output lines of processing unit 110. Coupling module 606 for example comprises, at its output, an output bus 604, for example, of AHB type, coupled to second bus 114, for example via FLASH memory interface 106. Coupling module 606 is for example hard-coded. In an example, coupling module 606 couples, for example, output lines of processing unit 110 to access lines of non-volatile memory 212, for example via FLASH memory interface 106 and second bus 114. In another example, coupling module 606 couples, for example, output lines of processing unit 110 to access lines of register 324, for example via FLASH memory interface 106 and second bus 114.

Figure 7:
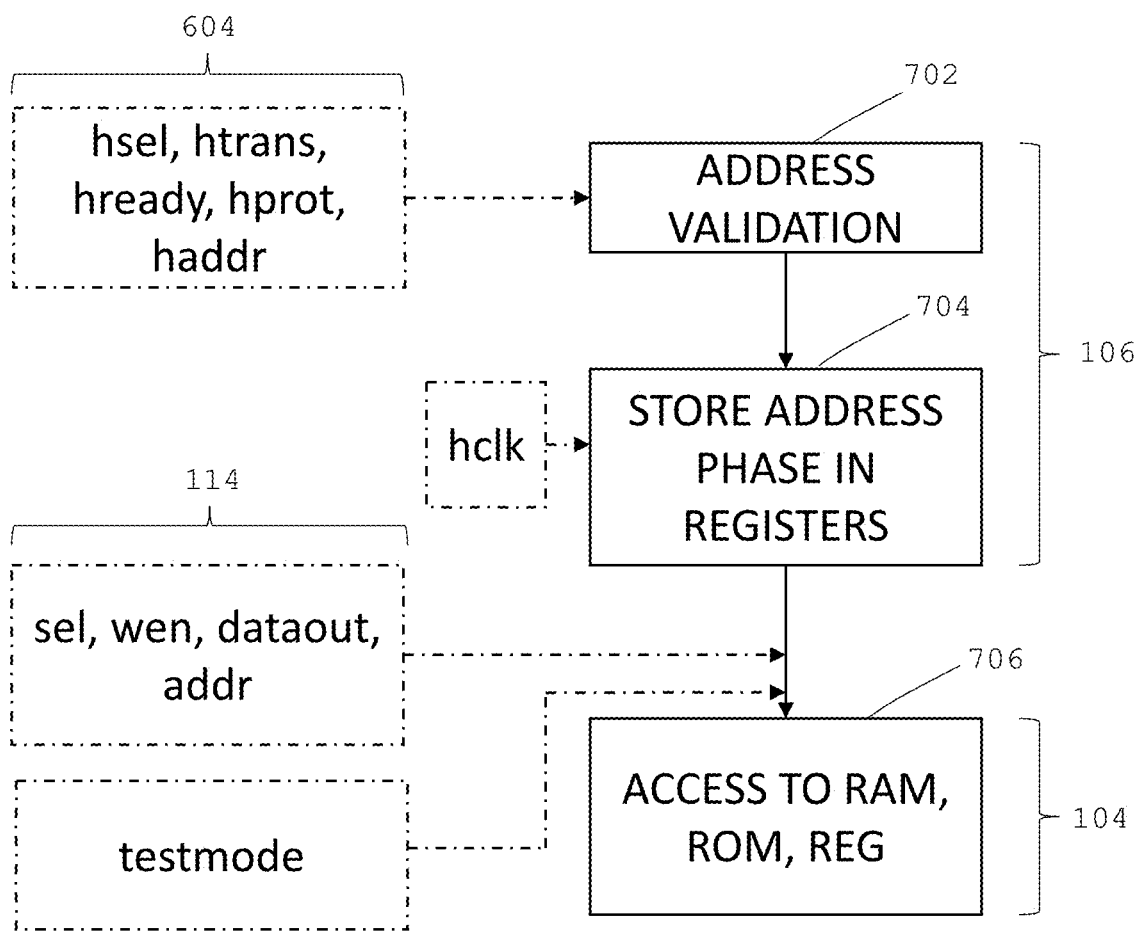
FIG. 7 is a block diagram illustrating an example of implementation of a method of access to the FLASH memory of the device of FIG. 6 in accordance with one or more embodiments.

FIG. 7 schematically shows an example of implementation of a method of access to the FLASH memory of the device of FIG. 6.

At a step 702 (ADDRESS VALIDATION), processing unit 110 sends, for example, a request, or requests, to an address of FLASH memory 104 which is transcribed, via coupling module 606 and virtual address translation module 232, into an address corresponding to register 324 and/or RAM 206 and/or ROM 212. At the output of coupling module 606, the request is conveyed by bus 604 all the way to FLASH memory interface 106. The request for example comprises known control signals according to the protocol of the AHB bus: hsel, htrans, hready, hprot, or haddr. The requested address is for example analyzed by FLASH memory interface 106 to be validated. If the address corresponds to the address of one of memories 206 or 212 or to register 324, then the address is validated.

At a step 704 (STORE ADDRESS PHASE IN REGISTERS), when the address is validated, it is stored into one or a plurality of registers of FLASH memory interface 106. A clock signal hclk is used, for example, for the storage of the address into the registers.

At a step 706 (ACCESS TO RAM, ROM, REG), an instruction to set the FLASH memory to the test mode (testmode) is sent, for example, to FLASH memory 104. Then, the request for accessing the memories 206, 212 or the register 324 of FLASH memory 104 is implemented, for example, via bus 114, with for example the known control signals: sel, wen, dataout, and/or addr, and by using the address stored at step 704 in FLASH memory interface 106, and translated, for example, by virtual address translation module 232.

Figure 8:
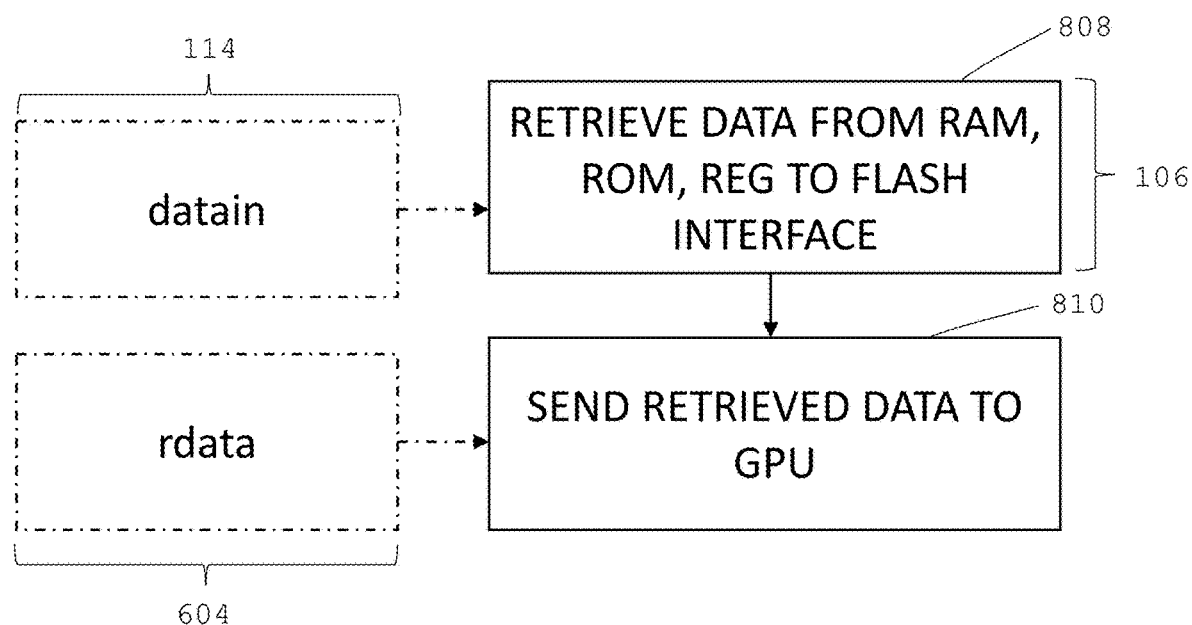
FIG. 8 is a block diagram illustrating an example of implementation of a method of reading from the FLASH memory of the device of FIG. 6 in accordance with one or more embodiments.

FIG. 8 shows in the form of blocks an example of implementation of a method of reading from the FLASH memory of the device of FIG. 6.

At a step 808 (RETRIEVE DATA FROM RAM, ROM, REG TO FLASH INTERFACE), the data originating from memory 206 or 212 or from register 324 are sent, for example, via bus 114, for example via a data bus datain of bus 114, to FLASH memory interface 106.

At a step 810 (SEND RETRIEVED DATA TO GPU), the obtained data are redirected, for example, via bus 604, for example via a data bus rdata of bus 604, to processing unit 110.

The methods of FIGS. 7 and 8 enable the access to the data of the FLASH memory, for example, during test modes, to be facilitated and the FLASH memory to be easily repaired and/or set.

Figure 9:
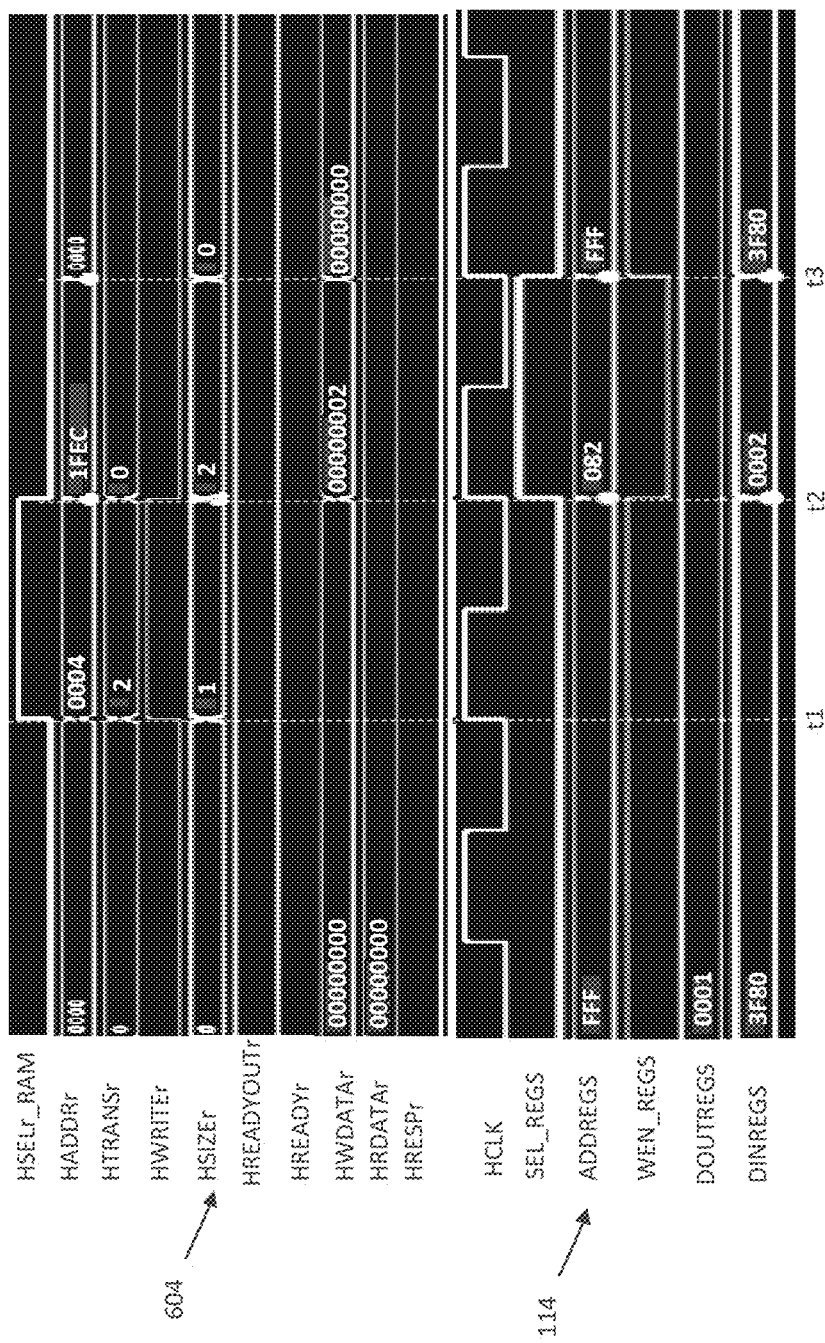
FIG. 9 is a timing diagram illustrating an example of implementation of a method of writing into the FLASH memory of the device of FIG. 6 in accordance with one or more embodiments.

FIG. 9 shows, in the form of timing diagrams, an example of implementation of a method of writing into the FLASH memory of the device of FIG. 6. FIG. 9 illustrates in particular an example of an access to the RAM of a set of signals internally generated by FLASH memory interface 106 based on the signals present over bus 604:

a signal for selecting bus HSELr_RAM;

an address signal HADDRr;

a transmission signal HTRANSr indicating the type of current transfer, wherein, for example: '00' indicates no ongoing transfer: IDLE; '01' indicates an ongoing transfer: BUSY; '10' indicates a transfer of data or of the first data of a data burst: NONSEQ; and '11' indicates a transfer of data in a data burst: SEQ_;

a write enable signal HWRITEr;

an access size signal HSIZEr;

a signal HREADYOUTr indicating that a transfer has ended over the bus and a signal HREADYr indicating that the previous transfer has ended;

a write data bus HWDATAr;

a read data bus HRDATAr; and a response signal HRESPr.

Further, FIG. 9 illustrates a set of signals transmitted over bus 114 to the FLASH memory:
- a clock signal HCLK;
- a bus selection signal SEL_REGS;
- an address signal ADDREGS;
- a write enable signal WEN_REGS;
- a data output signal DOUTREGS; and
- a data input signal DINREGS.

Before a time t1, which corresponds to a rising edge of selection signal HSELr_RAM and to a rising edge of clock signal HCLK, bus 604 is inactive. For examples, the signals over bus 604 for example have the following values while bus 604 is inactive from the write point of view (all the digital values in FIG. 9 are for example expressed in hexadecimal fashion): HSELr_RAM=low level, HADDRr=0000, HTRANSr=0, HWRITEr=low level, HSIZEEr=0, HREADTOUTr=high level, HREADYr=high level, HWDATAr=00000000, HRDATAr=000000000, HRESPr=low level. Similarly, before time t1, bus 114 is also inactive from the write point of view, and the signals delivered by the FLASH memory interface to bus 114 towards the FLASH memory are for example: SEL_REGS=low level, ADDREGS=FFF, WEN_REGS=high level, DOUTREGS=0001, DINREGS=3F80.

Between time t1 and a time t2, which corresponds to an address phase, a write instruction is received over bus 604. The write operation comprises an address phase during a first clock cycle HCLK between time t1 and time t2 and a data phase during a second clock cycle between time t2 and a time t3.

During the address phase, bus 114 remains inactive, and the next signals are for example modified as a result of the signals present on bus 604: HSELr_RAM=high level, HADDRr=0004, HTRANSr=2, HWRITEr=high level, HSIZEEr=1. These signals correspond, in this example, to a writing over 16 bits into a virtual address having 0004 as least significant bits. When signal HSELr_RAM switches to the high level, this for example enables to select the address corresponding to the RAM 206 of FLASH memory 104. For example, the FLASH memory interface detects that signal HSEL is active over bus 604, and that the address HADDR over bus 604 corresponds to the address of the registers of RAM 206, and thus activates selection signal HSELr_RAM. FLASH memory interface 106, for example, decodes the address delivered by processing unit 110 and stores it at value HADDRr, for example, here 0004. When HTRANSr=2, this enables to calculate the address of the registers of RAM 206 during the data phase. When HWRITEr is at the high level, this implies that the operation is a writing into a register designated by the virtual address. When HSIZEr is equal to 0, the size of the data to be written is for example equal to 8 bits. When HSIZEEr is equal to 1, the size of the data to be written is equal for example to 16 bits. When HSIZEEr is equal to 2, the size of the data to be written is equal for example to 32 bits.

The data phase is triggered by a rising edge of clock signal HCLK at time t2. Between time t2 and time t3, bus 604 for example becomes inactive again, and the following signals are modified for example as follows: HSELr_RAM=low level, HADDRr=IFEC, HTRANSr=0, HWRITEr=low level. Signal HSIZEr is for example not valid during the data phase. Between time t2 and time t3, signal SEL_REGS is set to a high level, which enables to select the registers into which the data are written. Between time t2 and time t3, signal ADDREGS switches to the value of the physical address of RAM 206, for example, 082. Indeed, the virtual address translation module 232 of FLASH memory interface 106 is for example configured to translate the virtual address 0004 known by processing unit 110 into a physical address 082 in RAM 206. Signal WEN_REGS is for example set to the low level, which activates, for example, the writing. Between time t2 and time t3, signal DINREGS, which contains the data originating from HWDATAr to be written, for example, here 0002, are written for example, by decreasing the number of bits presented over bus 604 to the 16 least significant bits only.

After time t3, buses 604 and 114 for example become inactive. The following signals are for example modified as follows: HADDRr=0000, HSIZEEr=0, HWDATAr=00000000, SEL_REGS=low level, ADDREGS=FFF, WEN_REGS=high level, DINREGS=3F80. The fact for signals ADDREGS and DINREGS to be, in the shown example, respectively at value FFF and 3F80 before t2 and after t3, is independent from the data writing process.

Figure 10:
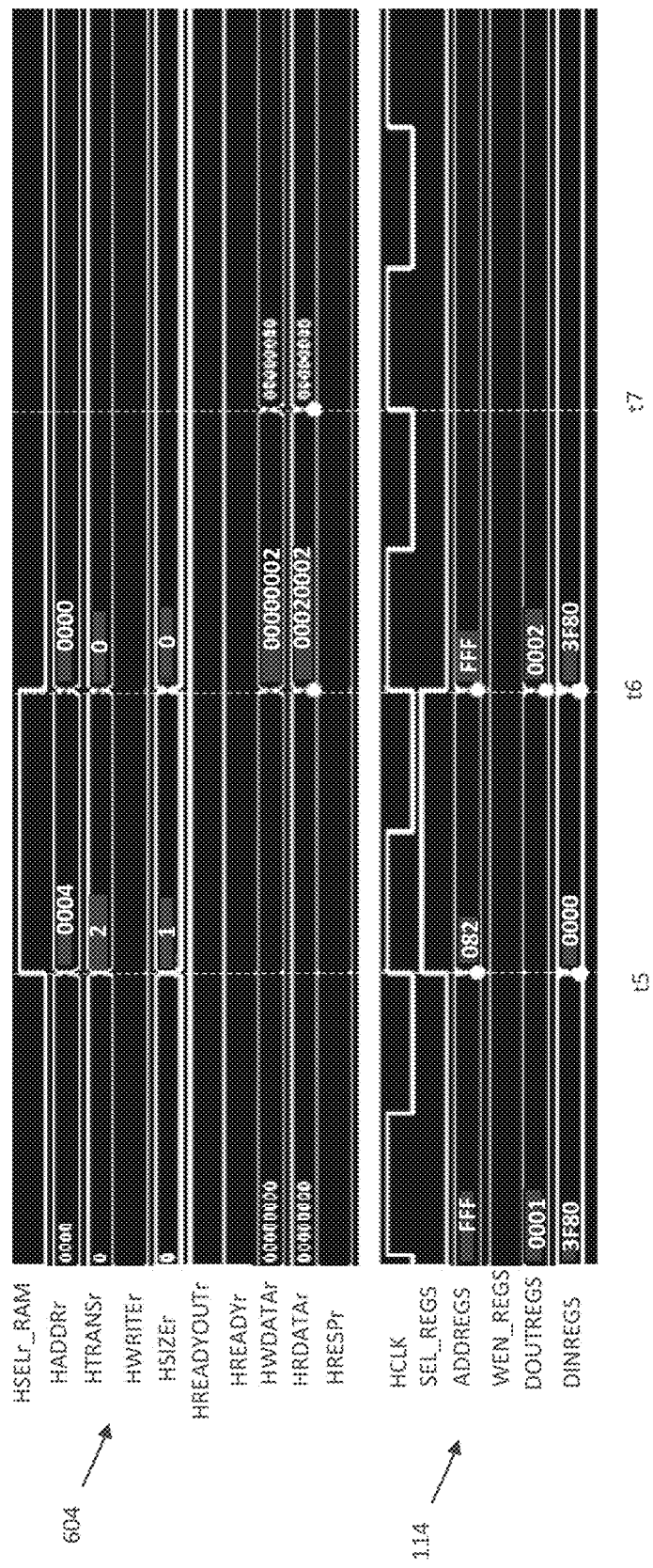
FIG. 10 is a timing diagram illustrating an example of implementation of a method of reading from the FLASH memory of the device of FIG. 6 in accordance with one or more embodiments.

FIG. 10 shows, in the form of a timing diagram, an example of implementation of a method of reading from the FLASH memory of the device of FIG. 6. FIG. 10 illustrates in particular the same signals as those illustrated in FIG. 9, but for the case of a read operation.

Before a time t5, which corresponds to a rising edge of clock signal HCLK and of signal HSELr_RAM, the signals of bus 604 for example have the following values: HSELr_RAM=low level, HADDRr=0000, HTRANSr=0, HWRITEr=low level, HSIZEr=0, HREADTOUTr=high level, HREADYr=high level, HWDATAr=00000000, HRDATAr=000000000, HRESPr=low level. Before time t5, the signals over bus 114 towards the FLASH memory interface are for example set to the following levels: SEL_REGS=low level, ADDREGS=FFF, WEN_REGS=high level, DOUTREGS=0001, DINREGS=3F80.

Between time t5 and a time t6, which corresponds to a rising edge of clock signal HCLK for example shifted by one clock cycle with respect to t5, the following values are modified, for example: HSELr_RAM=high level, HADDRr=0004, HTRANSr=2, HSIZEr=1, SEL_REGS=high level, ADDREGS=082, WEN_REGS=high level, DINREGS=0000. This enables to translate the address of RAM 206 requested by processing unit 110 into the physical address to be read of the registers of the RAM 206 of FLASH memory 104, here physical address 082.

Between time t6 and a time t7, which corresponds to a rising edge of clock signal HCLK for example shifted by one clock cycle with respect to t6, the following signals are modified, for example: HADDRr=0000, HTRANSr=0, HSIZEr=0, HWDATAr=00000002, HRDATAr=00000002, SEL_REGS=low level, ADDREGS=FFF, DOUTREGS=0002, DINREGS=3F80. This enables to read the data, for example here 0002, stored in the registers of RAM 206 of FLASH memory 104 by means of bus 114, via signal DOUTREGS, and to send them over bus 604 where they are for example contained in signal HRDATAr. In the example of FIG. 10, the data originating from DOUTREGS=0002 are sent to HRDATAr, which becomes 00020002. In this example, data 0002 coded over 16 bits in DOUTREGS are copied on the 16 most significant bits and the 16 least significant bits of HRDATAr. Those skilled in the art may, in another example, leave the data of DOUTREGS either on the most significant bits, or on the least significant bits.

After time t7, the following signals are modified, for example: HRDATAr=00000000, HWDATAr=00000000.

The fact for signals ADDREGS and DINREGS to be, in the shown example, respectively at value FFF and 3F80 before t5 and after t6, is independent from the data reading process.

Various embodiments and variants have been described. Those skilled in the art will understand that certain features of these various embodiments and variants may be combined, and other variants will occur to those skilled in the art. In particular, although the examples mention the implementation of a configuration value 202 for FLASH memory 104, those skilled in the art may implement a plurality of configuration values, for example in the form of a plurality of configuration bits. The type of bus 604 is, for example AHB bus type. In this case, the corresponding instructions may be coded differently from those described in the examples of FIGS. 9 and 10. The addresses of the registers, RAM and ROM memories of the FLASH memory are for example different from those given as an example in FIGS. 9 and 10.

Finally, the practical implementation of the described embodiments and variations is within the abilities of those skilled in the art based on the functional indications given hereabove.

What is claimed is:

1. A FLASH memory device comprising:
   a FLASH memory comprising a non-volatile memory, an array of non-volatile memory cells and a volatile memory, wherein the non-volatile memory is configured to store at least one of a program for controlling a write/programming controller or parameters for setting the array of non-volatile memory cells;
   a FLASH memory interface arranged outside of the FLASH memory;
   a first communication bus coupling the FLASH memory interface to the array of non-volatile memory cells; and
   a second communication bus coupling the FLASH memory interface to the volatile memory, the array of non-volatile memory cells being configured to store at least a value of configuration of the volatile memory and a program patch, the FLASH memory device being configured to
      obtain, by the FLASH memory interface via the first communication bus, between a powering up and a boot procedure of the FLASH memory device, the value of configuration of the volatile memory,
      according to the value of configuration of the volatile memory, obtain the program patch from the array of non-volatile memory cells of the FLASH memory, store the program patch within the FLASH memory interface, and load the program patch from the FLASH memory interface into the volatile memory of the FLASH memory over the second communication bus, and
      implement the program patch to correct or replace the control program stored in the non-volatile memory before the boot procedure of the FLASH memory device.

2. The FLASH memory device of claim 1, further comprising coupling circuitry configured to couple output lines of processing circuitry, located external to the FLASH memory device, to access lines of the volatile memory of the FLASH memory.

3. The FLASH memory device of claim 2, wherein the coupling circuitry is a bus addressing array.

4. The FLASH memory device of claim 1, wherein the write/programming controller is configured to implement programming, erasing, and verification of memory data.

5. The FLASH memory device of claim 4, further comprising coupling circuitry configured to couple output lines of processing circuitry, located external to the FLASH memory device, to access lines of the volatile memory and to the access lines of the non-volatile memory.

6. The FLASH memory device of claim 1, wherein the FLASH memory interface comprises a writing/reading interface configured to write data into the array of non-volatile memory cells of the FLASH memory, and to read data from the array of non-volatile memory cells of the FLASH memory.

7. The FLASH memory device of claim 1, wherein the second communication bus is a synchronous bus.

8. The FLASH memory device of claim 1, wherein the FLASH memory further comprises at least one register storing at least one of a value of configuration of the FLASH memory or parameters for setting the array of non-volatile memory cells.

9. The FLASH memory device of claim 8, further comprising coupling circuitry configured to couple output lines of processing circuitry, located external to the FLASH memory device, to access lines of the at least one register.

10. The FLASH memory device of claim 1, wherein the array of non-volatile memory cells is configured to store the value of configuration of the volatile memory and the program patch in an access protected control area of the FLASH memory.

11. The FLASH memory device of claim 1, wherein the FLASH memory interface comprises a finite state machine configured to control obtaining of the program patch from the array of non-volatile memory cells and delivering the program patch to the volatile memory via the second communication bus.

12. The FLASH memory device of claim 1, wherein the FLASH memory interface comprises virtual address translation circuitry configured to translate virtual addresses into physical addresses.

13. A method for accessing FLASH memory in a FLASH memory device using a FLASH memory interface arranged outside of the FLASH memory, the FLASH memory comprising a non-volatile memory, an array of non-volatile memory cells and a volatile memory, the non-volatile memory storing at least one of a program for controlling a write/programming controller or parameters for setting the array of non-volatile memory cells, the method comprising:
   accessing data stored in the array of non-volatile memory cells via a first communication bus coupling the FLASH memory interface to the array of non-volatile memory cells; and
   accessing data stored in the volatile memory via a second communication bus coupling the FLASH memory interface to the volatile memory, the array of non-volatile memory cells being configured to store at least a value of configuration of the volatile memory and a program patch;
   obtaining, by the FLASH memory interface via the first communication bus, between a powering up and a boot procedure of the FLASH memory device, the value of configuration of the volatile memory;
   according to the value of configuration of the volatile memory, obtaining the program patch from the array of non-volatile memory cells of the FLASH memory, storing the program patch within the FLASH memory interface, and loading the program patch from the FLASH memory interface into the volatile memory of the FLASH memory over the second communication bus; and implementing the program patch to correct or replace the control program stored in the non-volatile memory before the boot procedure of the FLASH memory device.

14. The method of claim 13, further comprising:
coupling, by coupling circuitry, output lines of processing circuitry, located external to the FLASH memory device, to access lines of the volatile memory of the FLASH memory.

15. The method of claim 13, further comprising:
storing, in the non-volatile memory of the FLASH memory, at least one of the program for controlling the write/programming controller or the parameters for setting the array of non-volatile memory cells.

16. The method of claim 13, further comprising:
storing, in the array of non-volatile memory cells, the value of configuration of the volatile memory and the program patch in an access protected control area of the FLASH memory.

17. The method of claim 13, further comprising:
storing, in the array of non-volatile memory cells, the program patch; and
controlling, by a finite state machine of the FLASH memory interface, obtaining of the program patch from the array of non-volatile memory cells and delivering the program patch to the volatile memory via the second communication bus.

18. A method of booting a FLASH memory in a FLASH memory device using a FLASH memory interface arranged outside of the FLASH memory, the FLASH memory comprising a non-volatile memory, an array of non-volatile memory cells and a volatile memory, wherein the non-volatile memory is configured to store at least one of a program for controlling a write/programming controller or parameters for setting the array of non-volatile memory cells, wherein the array of non-volatile memory cells is configured to store a value of configuration of the volatile memory and a program patch, the method comprising:
obtaining the value of configuration of the volatile memory, by the FLASH memory interface via a first communication bus, between a powering up and a boot procedure of the FLASH memory device; and
obtaining, based on the value of configuration of the volatile memory, the program patch from the array of non-volatile memory cells of the FLASH memory, storing the program patch within the FLASH memory interface, and loading the program patch from the FLASH memory interface into the volatile memory of the FLASH memory via a second communication bus; and
implementing the program patch to correct or replace the control program stored in the non-volatile memory before the boot procedure of the FLASH memory device.

19. The method of claim 18, further comprising:
coupling, by coupling circuitry, output lines of processing circuitry, located external to the FLASH memory device, to access lines of the volatile memory of the FLASH memory.

20. The method of claim 18, further comprising:
storing, in the non-volatile memory of the FLASH memory, at least one of the program for controlling the write/programming controller or the parameters for setting the array of non-volatile memory cells.

* * * * *